United States Patent
Wu et al.

(10) Patent No.: US 9,977,947 B2
(45) Date of Patent: May 22, 2018

(54) FINGERPRINT IDENTIFICATION METHOD AND DEVICE THEREOF

(71) Applicant: Gingy Technology Inc., Hsinchu (TW)

(72) Inventors: Jen-Chieh Wu, Hsinchu (TW); Chun-Lang Hung, Taichung (TW)

(73) Assignee: Gingy Technology Inc., Hsinchu (TW)

( * ) Notice: Subject to any disclaimer, the term of this patent is extended or adjusted under 35 U.S.C. 154(b) by 79 days.

(21) Appl. No.: 15/208,619

(22) Filed: Jul. 13, 2016

(65) Prior Publication Data

US 2017/0323139 A1 Nov. 9, 2017

Related U.S. Application Data

(63) Continuation-in-part of application No. 14/978,237, filed on Dec. 22, 2015, now Pat. No. 9,770,199, and a continuation-in-part of application No. 14/835,130, filed on Aug. 25, 2015.

(51) Int. Cl.
*G06K 9/00* (2006.01)

(52) U.S. Cl.
CPC ....... *G06K 9/0004* (2013.01); *G06K 9/00087* (2013.01)

(58) Field of Classification Search
None
See application file for complete search history.

(56) References Cited

U.S. PATENT DOCUMENTS

| 2007/0189586 | A1* | 8/2007 | Monden | G06K 9/0008 382/124 |
| 2008/0095412 | A1* | 4/2008 | Fujieda | A61B 5/02007 382/124 |
| 2011/0150303 | A1* | 6/2011 | Dinerstein | G06K 9/00033 382/124 |
| 2014/0294262 | A1* | 10/2014 | Schuckers | G06K 9/00114 382/125 |
| 2015/0062319 | A1* | 3/2015 | Higuchi | A61B 5/1171 348/77 |
| 2015/0095816 | A1* | 4/2015 | Pan | G06F 3/0481 715/765 |

FOREIGN PATENT DOCUMENTS

TW      201101196      1/2011

* cited by examiner

*Primary Examiner* — Sumati Lefkowitz
*Assistant Examiner* — David Perlman
(74) *Attorney, Agent, or Firm* — JCIPRNET (57) ABSTRACT

A fingerprint identification method is provided. The method includes steps as follows: having a finger press on a photoelectronic sensor module; respectively emitting an invisible light beam reflected to a photoelectronic sensor module after passing through the finger and a visible light beam reflected to the photoelectronic sensor module via a surface of the finger; generating, by the photoelectronic sensor module, photocurrent signals based on the visible light beam and the invisible light beam; respectively generating, by an analog/digital converter module, a first digital signal and a second digital signal based on the photocurrent signals; and outputting, by a processor module, the first digital signal as a gray-scale fingerprint image and a second digital signal as a colored fingerprint image. The invention also provides a fingerprint identification device performing the fingerprint identification method.

11 Claims, 11 Drawing Sheets

FINGERPRINT IDENTIFICATION METHOD AND DEVICE THEREOF

BACKGROUND OF THE INVENTION

1. Field of the Invention

The invention relates to an identification method and an identification device, particularly relates to a fingerprint identification method and a fingerprint identification device.

2. Description of Related Art

Fingerprint identification, as the name indicates, relates to identification based on the unique fingerprint information on a finger of the human body. A conventional fingerprint identification device may include two elements. One of the components is a fingerprint sensor, which mainly serves to collect a complete fingerprint image. The other of the components is a fingerprint identification algorithm. After the fingerprint sensor at the front end collects the fingerprint image, the fingerprint identification algorithm may subsequently process the fingerprint image, extract features of the fingerprint, generate a fingerprint template, discard the original fingerprint image, and then perform fingerprint comparison.

Common finger print sensors may be classified into capacitive and optical fingerprint sensors. Currently, common capacitive fingerprint sensors include RF capacitive sensors, pressure sensors, and thermal sensors, etc. The principle of the capacitive fingerprint sensor is that, by integrating miniaturized sensors, such as capacitive sensors or pressure sensors, at a high density into a chip, when the finger presses on a surface of the chip, the miniaturized capacitive sensors inside the chip may generate different charges (or temperature differences) based on aggregation of peaks and troughs of the fingerprint, thereby forming a fingerprint image.

The capacitive sensor has the advantages of being thin and small in size, thus having a broad applicability in handheld devices. However, the cost of the capacitive sensor is higher and the durability thereof remains challenged. In addition, a whole wafer needs to be cut order for the capacitive sensor to maintain a certain press area. Thus, the cost of each chip is very high. Furthermore, the capacitive sensor itself is an exposed semiconductor chip, so the chip surface may be eroded or the chip may generate static electricity because of the sweat on the finger and the acid/alkaline property thereof. Thus, the durability and lifetime of the capacitive sensor may be significantly decreased. Consequently, some may additionally attach a sapphire substrate to the surface of the capacitive sensor for protection. However, such protective measure also increases the manufacturing cost.

On the other hand, the optical fingerprint sensor is the earliest fingerprint collecting device and mainly includes a light source, a dispersive prism, and a charge coupled device (CCD). By pressing the dispersive prism with the finger, the fingerprint image is obtained by means of absorption and destruction to the total reflection of light by the peaks and troughs of the fingerprint. Then, the image is captured and output by the CCD. With the optical fingerprint sensor, the chip is not touched when the fingerprint is collected. Namely, the position pressed by the finger is an optical component formed of acrylic resin or glass. Thus, the optical fingerprint sensor is cheaper and more durable. However, due to its greater size and assembling complexities, it is difficult to install the optical fingerprint sensor inside the handheld device.

Moreover, some may forge a fake finger using a silica gel material. The fake finger made of a silica gel material may have fingerprint and blood capillaries, making it similar to a real finger. Thus, by having the fake finger with the fingerprint and blood capillaries press on the fingerprint identification device, the fingerprint identification device may be deceived by the fake finger, as the fake finger also exhibits deformation, fingerprint, and blood capillary features identical to those of the real finger pressing on the fingerprint identification device. Thus, the fingerprint identification device is unable to determine whether the finger pressing thereupon is a real finger, which creates a loophole in identification.

Therefore, the capacitive fingerprint sensor may be affected by ambient static electricity and has a higher manufacturing cost, whereas the optical fingerprint sensor has a larger size and is not suitable for application in a handheld device. In addition, the fake finger may be used to deceive the fingerprint identification device to pass a 3D fingerprint validation procedure of the fingerprint identification device by simulating the deformation, fingerprint, and blood capillary characteristics of the real finger. Thus, how to design a fingerprint identification device free of influence of the ambient static electricity, having a smaller size and lower manufacturing cost, and capable of identifying the blood vessels of the real finger remains an issue to work on.

SUMMARY OF THE INVENTION

Since a fake finger made of a silica gel material may exhibit deformation, fingerprint, and blood capillary characteristics similar to those of a real finger, such fake finger may easily pass a 3D fingerprint validation procedure of a fingerprint identification device. Accordingly, a fingerprint identification method and a fingerprint identification device are provided to solve the issue that the fake finger made of a silica gel material may easily pass the validation of the fingerprint identification device.

A fingerprint identification method according to an embodiment of the invention includes steps as follows: placing a finger on a photoelectronic sensor module; emitting an invisible light beam toward the finger by a first light emitting element and emitting a visible light beam toward the finger by a second light emitting element; reflecting the invisible light beam to the photoelectronic sensor module after the invise light beam passes through the finger, such that the photoelectronic sensor module receives at least one invisible light intensity signal of the invisible light beam, and reflecting the visible light beam to the photoelectronic sensor module via a surface of the finger, such that the photoelectronic sensor module receives at least one visible light intensity signal of the visible light beam; generating at least one invisible light photocurrent signal based on the invisible light intensity signal by the photoelectronic sensor module, generating at least one visible light photocurrent signal based on the visible light intensity signal by the photoelectronic sensor module, and transmitting the invisible light photocurrent signal and the visible light photocurrent signal respectively to an analog/digital converter module by the photoelectronic sensor module; generating at least one first digital signal based on the invisible light photocurrent signal by the analog/digital converter module, generating at least one second digital signal based on the visible light photocurrent signal by the analog/digital converter module, and transmitting the first digital signal and the second digital signal respectively to a processor module by the analog/digital converter module; and generating a gray-scale fingerprint image based on the first digital signal by the processor module, generating a colored fingerprint image based on the second digital signal by the processor module, and performing identification based on the gray-scale fingerprint image and the colored fingerprint image.

A fingerprint identification device is also provided in an embodiment of the invention to identify a fingerprint image of a finger. The fingerprint identification device includes a photoelectronic sensor module, at least one first light emitting element, at least one second light emitting element, an analog/digital converter module, and a processor module. The photoelectronic sensor module has a light receiving surface and is configured for the finger to come into contact with. The first light emitting element emits an invisible light beam toward the finger. The second light emitting element emits a visible light beam toward the finger. The analog/digital converter module is electrically connected to the photoelectronic sensor module, and the processor module is electrically connected to the analog/digital converter module.

The invisible light beam is reflected to the photoelectronic sensor module after passing through the finger, such that the photoelectronic sensor module receives at least one invisible light intensity signal of the invisible light beam, and the visible light beam is reflected to the photoelectronic sensor module via a surface of the finger, such that the photoelectronic sensor module receives at least one visible light intensity signal of the visible light beam. The photoelectronic sensor module respectively converts the invisible light intensity signal into an invisible light photocurrent signal and converts the visible light intensity signal into a visible light photocurrent signal. The analog/digital converter module respectively converts the invisible light photocurrent signal into a first digital signal and converts the visible light photocurrent signal into a second digital signal. The processor module respectively outputs a gray-scale fingerprint image based on the first digital signal and outputs a colored fingerprint image based on the second digital signal for identification.

A fingerprint identification method according to another embodiment of the invention includes steps as follows: placing a finger on a photoelectronic sensor module; emitting a light beam toward the finger by a second light emitting element; reflecting the visible light beam to the photoelectronic sensor module via a surface of the finger, such that the photoelectronic sensor module receives at least one visible light intensity signal of the visible light beam; generating at least one visible light photocurrent signal based on the visible light intensity signal, by the photoelectronic sensor module, and transmitting the visible light photocurrent signal to an analog/digital converter module by the photoelectronic sensor module; generating at least one second digital signal based on the visible light photocurrent signal by the analog/digital converter module, and transmitting the second digital signal to a processor module by the analog/digital converter module; and generating a colored fingerprint image and/or a gray-scale fingerprint image based on the second digital signal and performing identification based on the colored fingerprint image and/or the gray-scale fingerprint image by the processor module.

According to the embodiments of the invention, the photoelectronic sensor module receives the invisible light beam passing through the finger and the visible light beam reflected by the finger, and the gray-scale fingerprint image and the colored fingerprint image are simultaneously identified, so as to prevent a loophole of fingerprint identification and thus increase an accuracy of identification. Consequently, with the characteristics of being light and compact of the photoelectronic sensor module, the fingerprint identification device according to the embodiments of the invention may be applied in a handheld device, thereby improving on the issue that the conventional optical fingerprint identification device is too large to be used in the handheld device. In addition, by adopting a photoelectric separation-type sensing, the influence of ambient static electricity on the conventional capacitive fingerprint sensor may be reduced, and a sapphire substrate as protection in the conventional technology is no longer required. Therefore, a manufacturing cost may be significantly decreased.

Besides, in the case that blood capillaries are designed in a forged finger made of a silica gel material, by converting between chromaticity coordinates, the predetermined second skin color threshold of the second chromaticity coordinates may be used to validate again whether the blood capillaries are real. Accordingly, the loophole of fingerprint identification is eliminated by avoiding the forged fingerprint produced by utilizing the characteristic of skin color variation of the first chromaticity coordinates, thereby enhancing the capability of correctly distinguishing between real and forged fingerprints.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
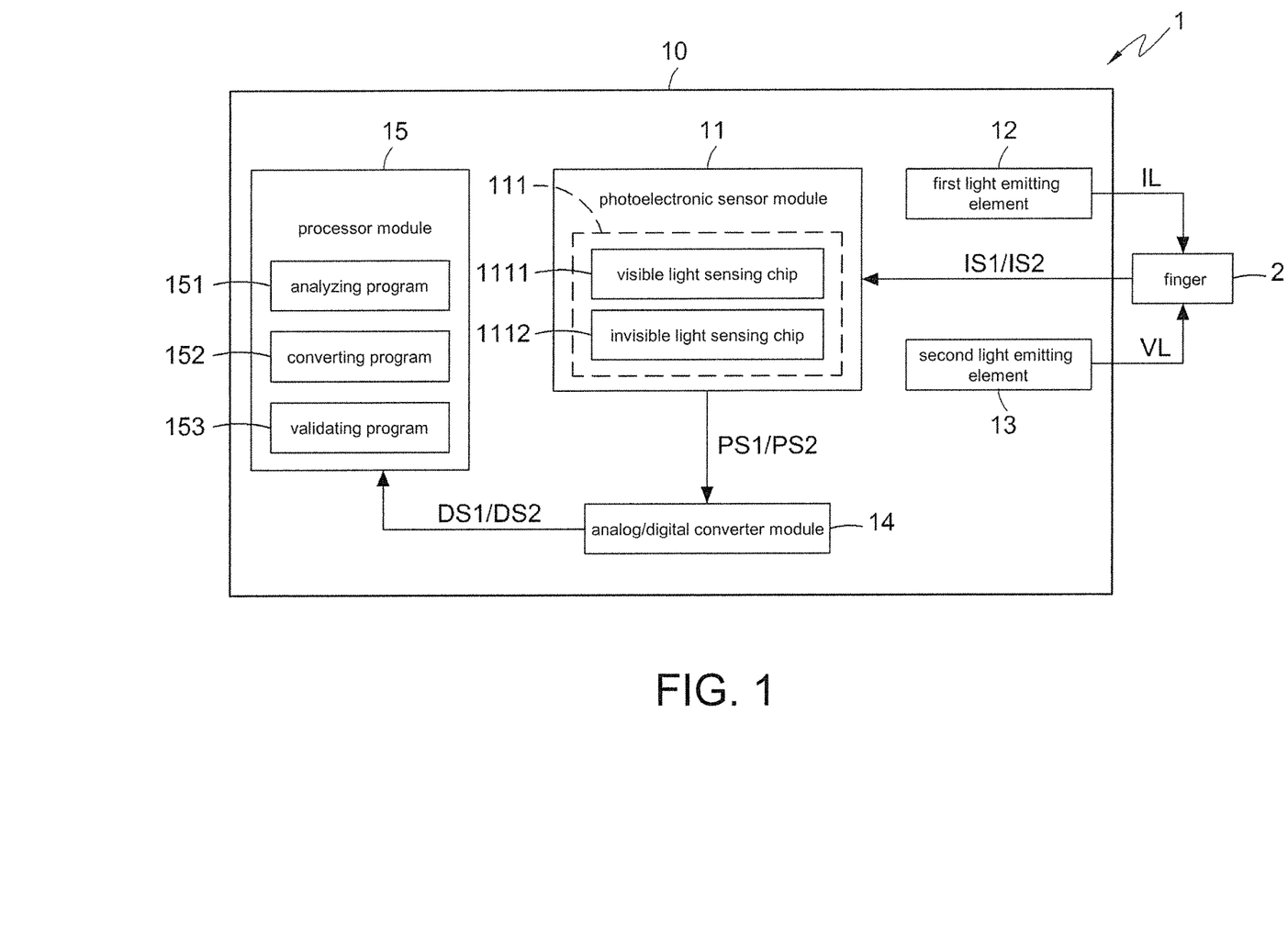
FIG. 1 is a schematic block view of a fingerprint identification device according to an embodiment of the invention.
Figure 2:
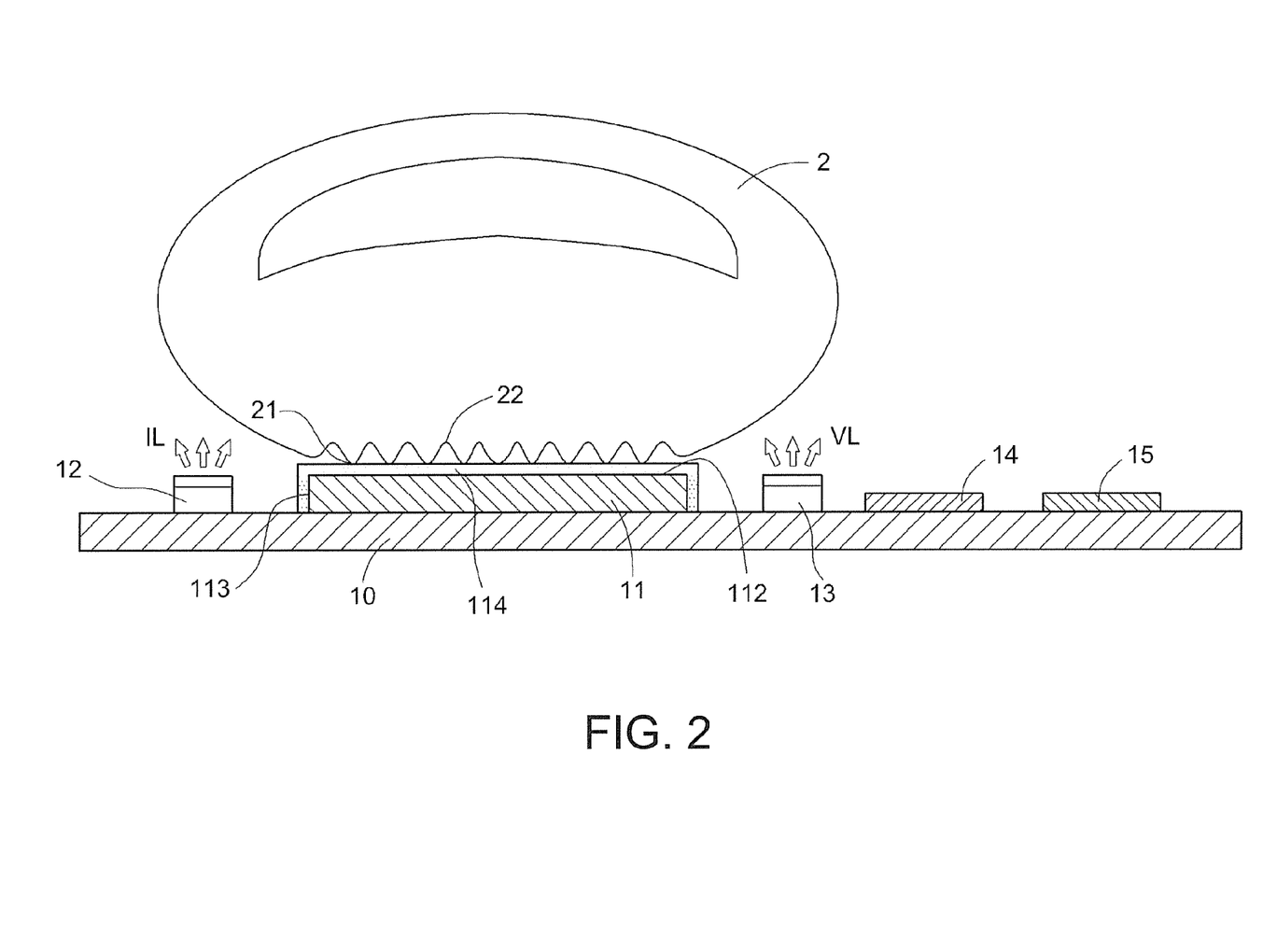
FIG. 2 is a schematic framework of the fingerprint identification device according to an embodiment of the invention.
Figure 3:
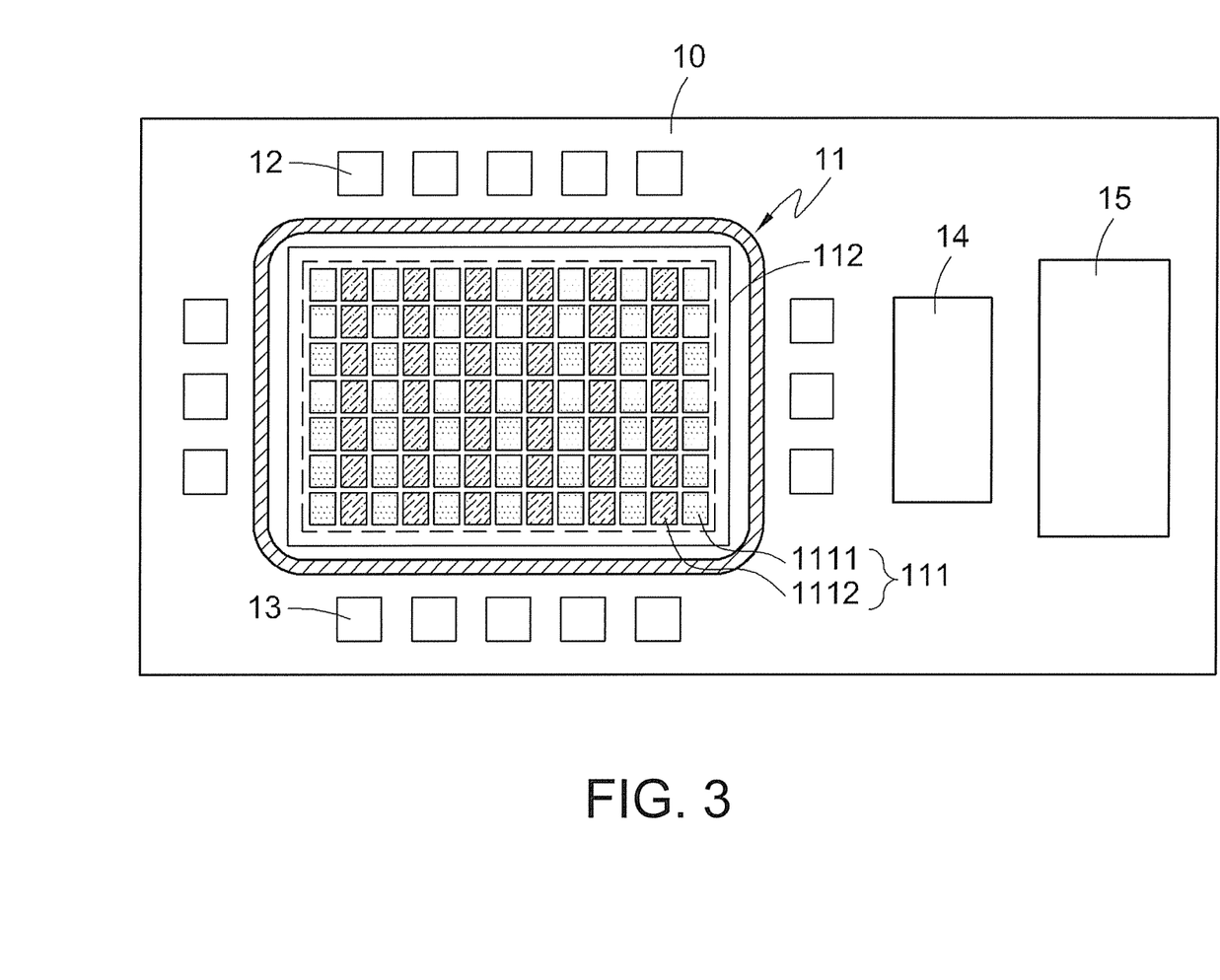
FIG. 3 is schematic view illustrating a photoelectronic sensor module of the fingerprint identification device according to an embodiment of the invention.

Referring to FIGS. 1 and 3, FIGS. 1 and 3 are respectively a schematic block view of a fingerprint identification device, a schematic framework of the fingerprint identification device, and a photoelectronic sensor module of the fingerprint identification device according to embodiments of the invention. The fingerprint identification device 1 includes a functional circuit board 10, a photoelectronic sensor module 11, at least one first light emitting element 12, at least one second light emitting element 13, an analog/digital converter module 14, and a processor module 15. The functional circuit board 10 provides the photoelectronic sensor module 11, and the first light emitting element 12 and the second light emitting element 13 are electrically disposed on the functional circuit board 10. The first light emitting element 12 and the second light emitting element 13 include, but are not limited to, a light emitting diode.

In addition, the photoelectronic sensor module 11 is respectively electrically connected to the analog/digital converter module 14 and the processor module 15. In this embodiment, the analog/digital converter module 14 and the processor module 15 may be electrically disposed on the functional circuit board 10. However, it should be understood that the invention is not limited thereto. The analog/digital converter module 14 and the processor module 15 may also be mounted on a portable electronic device (not shown), and the photoelectronic sensor module 11 may be respectively electrically connected to the analog/digital converter module 14 and the processor module 15 disposed in the portable electronic device in a manner of external electrical connection, so as to perform an identification process.

In the invention, the photoelectronic sensor module 11 is formed by arranging a plurality of photoelectronic sensing elements 111 in an array. The photoelectronic sensing elements 111 include visible light sensing chips 1111 and invisible light sensing chips 1112. The visible light sensing chips 1111 and the invisible light sensing chips 1112 are arranged in adjacency, and the photoelectronic sensing elements 111 form a light receiving surface 112 for a finger 2 to come into contact with the light receiving surface 112. Moreover, a scattering medium 114 is included. The scattering medium 114 mainly serve to cover the light receiving surface 112 of the photoelectronic sensor module 11. However, it should be noted that the invention is not limited thereto. In an exemplary embodiment, the scattering medium 114 covers the light receiving surface 112 and four lateral surfaces 113 of the photoelectronic sensor module 11. Thus, a surface of the scattering medium 114 is formed as an interface for the finger 2 to press on. In the invention, when light beams emitted by the first light emitting element 12 and the second light emitting element 13 enter the scattering medium 114, a visible light beam may be homogenized by the scattering medium 114, such that the scattering medium 114 may serve as a homogeneous surface light source to allow a whole surface of the finger 2 to completely receive light.

In the invention, the first light emitting element 12 and the second light emitting element 13 may be respectively disposed near a periphery of the photoelectronic sensor module 11. In addition, based on the needs, the first light emitting element 12 and the second light emitting element 13 may be packaged together or separately, as long as the first light emitting element 12 and the second light emitting element 13 are disposed near the periphery of the photoelectronic sensor module 11. In addition, the first light emitting element 12 may emit an invisible light beam IL. The invisible light beam IL may be radiation of infrared light whose wavelength ranges from 780 nm to 3000 nm. The second light emitting element 13 may emit a visible light beam VL. The visible light beam VL may be radiation of light whose wavelength ranges from 400 nm to 700 nm.

Accordingly, when the finger 2 comes into contact with the light receiving surface 112 of the photoelectronic sensor module 11, the functional circuit board 10 may drive the first light emitting element 12 and the second light emitting element 13 to respectively emit the visible light beam IL and the invisible light beam VL, so as to irradiate the finger 2 via the scattering medium 114. It should be noted that the visible light beam VL emitted by the second light emitting element 13 may be light with multiple wavelengths. The light with multiple wavelengths is able to provide more image information to the photoelectronic sensor module 11, thereby capturing a multi-colored fingerprint image. After the photoelectronic sensor module 11 respectively receives fingerprint images based on the visible light beam and the invisible light beam, the photoelectronic sensor module 11 may transmit the fingerprint images to the processor module 15.

Figure 4:
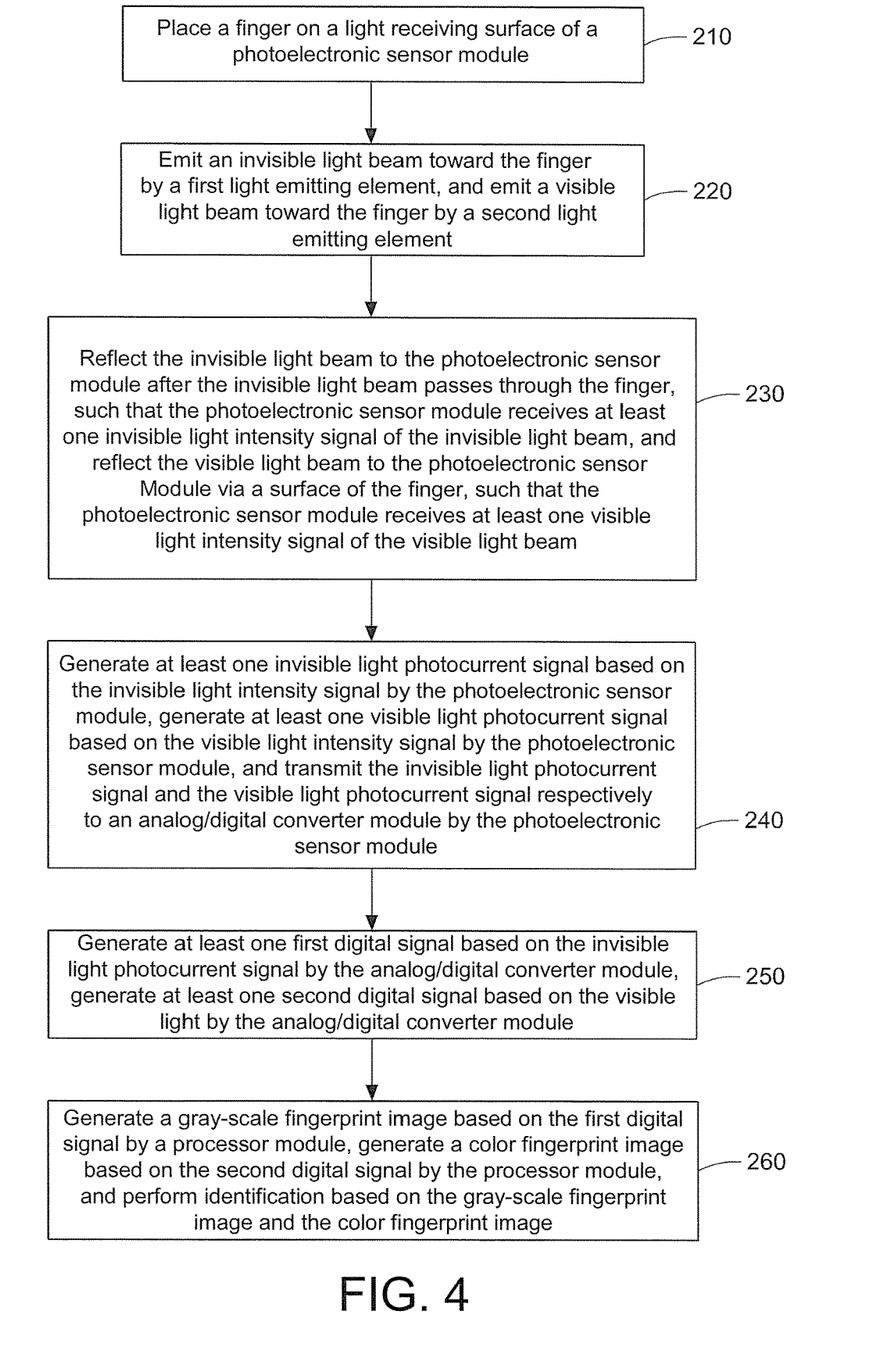
FIG. 4 is a schematic flowchart illustrating a fingerprint identification method according to an embodiment of the invention.

Referring to FIG. 4, FIG. 4 is a schematic flowchart illustrating a fingerprint identification method according to an embodiment of the invention. The method includes steps as follows:

Step 210: placing the finger 2 on the light receiving surface 112 of the photoelectronic sensor module 11;

Step 220: emitting the invisible light beam IL toward the finger 2 by the first light emitting element 12 and emitting the visible light beam VL toward the finger 2 by the second light emitting element 13;

Step 230: reflecting the invisible light beam IL to the photoelectronic sensor module 11 after the invisible light beam IL passes through the finger 2, such that the photoelectronic sensor module 11 receives at least one invisible light intensity signal IS1 of the invisible light beam IL, and reflecting the visible light beam VL to the photoelectronic sensor module 11 via a surface of the finger 2, such that the photoelectronic sensor module 11 receives at least one visible light intensity signal IS2 of the visible light beam VL;

Step 240: generating at least one invisible light photocurrent signal PS1 based on the invisible light intensity signal IS1 by the photoelectronic sensor module 11, generating at least one visible light photocurrent signal PS2 based on the visible light intensity signal IS2 by the photoelectronic sensor module 11, and transmitting the invisible light photocurrent signal PS1 and the visible light photocurrent signal PS2 respectively to the analog/digital converter module 14 by the photoelectronic sensor;

Step 250: generating at least one first digital signal DS1 based on the invisible light photocurrent signal PS1 by the analog/digital converter module 14, and generating at least one second digital signal DS2 based on the visible light photocurrent signal PS2 by the analog/digital converter module 14; and Step 260: generating a gray-scale fingerprint image based on the first digital signal DS1 by the processor module 15, generating a colored fingerprint image based on the second digital signal DS2 and performing identification based on the gray-scale fingerprint image and the colored fingerprint image by the processor module 15.

In Step 210, the finger 2 presses on the light receiving surface 112 of the photoelectronic sensor module 11. However, the invention is not limited thereto. The finger 2 may also press on the surface of the scattering medium 114 on the light receiving surface 112. Then, the functional circuit board 10 may drive the first light emitting element 12 to emit the invisible light beam IL toward the finger 2, and drive the second light emitting element 13 to emit the visible light beam VL toward the finger 2.

At Step 220, at least the following modes are available for an order of emission of the light emitting element 12 and the second light emitting element 13: a first mode, where the first light emitting element 12 and the second light emitting element 13 respectively and synchronously emit the visible light beam IL and the invisible light beam VL; a second mode, where the second light emitting element 13 emits the visible light beam VL after the first light emitting element 12 emits the invisible light beam IL and the gray-scale fingerprint image is obtained; a third mode, where the first light emitting element 12 and the second light emitting element 13 may alternately emit the invisible light beam IL and the visible light beam VL based on a temporal sequence, that is, the first light emitting element 12 emits the invisible light beam IL toward the finger 2 and is turned off, and then the second light emitting element 13 emits the visible light beam VL toward the finger 2, thereby repetitively and alternately emitting the invisible light beam IL and the visible light beam VL toward the finger 2.

At Step 230, the surface of the finger 2 has a skin pattern trough 21 and a skin pattern peak 22. Since the skin pattern trough 21 contacts the light receiving surface 112, the invisible light beam may directly enter the light receiving surface 112 via the skin pattern trough 21 after passing through the finger 2, so as to obtain the invisible light intensity signal IS1 having a high light intensity. Since a gap is present between the skin pattern peak 22 and the light receiving surface 112, part of the invisible light beam IL may enter the light receiving surface 112 after being scattered and refracted after penetrating out of the finger 2 from the skin pattern peak 22 from the finger. Accordingly, the invisible light intensity signal IS1 having a low light intensity is obtained, and a light intensity contrast between the skin pattern trough 21 and the skin pattern peak 22 is obtained.

Similarly, assuming the second light emitting element 13 to be a multiple wavelength light source, for example, since the skin pattern trough 21 contacts the light receiving surface 112, the visible light beam VL may be directly reflected to the photoelectronic sensor module 11 via the skin pattern trough 21, so as to obtain the visible light intensity signal IS2 having a high light intensity. Similarly, since a gap is provided between the skin pattern peak 22 and the light receiving surface 112, the visible light beam VL is reflected to the photoelectronic sensor module 11 after being scattered and refracted when entering the skin pattern peak 22. Accordingly, the visible light intensity signal IS2 having a lower light intensity is obtained.

At Step 240, the photoelectronic sensor module 11 may simultaneously receive the invisible light intensity signals IS1 that enter the finger 2 and penetrating out of the finger 2 from the skin pattern trough 21 and the skin pattern peak 22, and then generating the invisible light photocurrent signals PS1 based on the invisible light intensity signals IS1. Similarly, the photoelectronic sensor module 11 may also simultaneously receive the visible light intensity signals IS2 reflected by the skin pattern trough 21 and the skin pattern peak 22 of the finger 2, and generate the visible light photocurrent signals PS2 based on the visible light intensity signals IS2. The photoelectronic sensor module 11 may respectively transmit the invisible light photocurrent signals PS1 and the invisible light photocurrent signals PS2 to the analog/digital converter module 14 for further processing.

It should be noted that the photoelectronic sensor module 11 of the invention normally operates through photoelectronic conversion, such as photovoltaic, phototransmissive, or photoemissive conversions. For example, photovoltaic conversion normally occurs at a junction of two different materials. When the visible light beam VL or the invisible light beam IL irradiates the junction, two ends of the junction may generate an output voltage in relation to illuminance. For example, a p-n junction of semiconductor materials such as silicon, germanium, or indium antimonide may be used for such operation. Phototransmissive conversion normally involves a semiconductor material. A resistance of the semiconductor material may decrease as the illuminance increases, and an electrical conductivity is generated as the material absorbs energy carried by emitted photons that leads to generation of charge carriers. A principle of photoemissive conversion is that, when the energy of the emitted light is high enough, electrons may be departed from trajectories and emitted. The photoelectronic conversions of the photoelectronic sensor module 11 above are merely described as examples, and it should be understood that the invention is not limited thereto. Based on practical needs, the suitable photoelectronic conversion of the photoelectronic sensor module 11 may be chosen correspondingly.

At Step 250, the analog/digital converter module 14 generates at least one first digital signal DS1 based on intensity of the invisible light photocurrent signal PS1, and the analog/digital converter module 14 generates at least one second digital signal DS2 based on intensity of the visible light photocurrent signal PS2. In addition, the analog/digital converter module 14 may, based on practical needs, further perform a signal filtering process or a signal amplifying process to the first digital signal DS1 or the second digital signal DS2 and transmit the first digital signal DS1 or the second digital signal DS2 to the processor module 15.

At Step 260, the processor module 15 includes an analyzing program 151, a converting program 152, and a validating program 153. Here, the analyzing program 151 may process the first digital signal DS1 to obtain a gray-scale fingerprint image corresponding to the skin pattern trough 21 (bright region) and the skin pattern peak 22 (dark region) of the finger 2. The validating program 153 determines an identity of the user based on the gray-scale fingerprint image (invisible light beam).

In addition, the analyzing program 151 of the processor module 15 may analyze the colored fingerprint image (visible light beam) with a first color model, such as an RGB color model. However, it should be understood that the invention is not limited thereto. The converting program 152 is configured to convert first chromaticity coordinates of the first color model into second chromaticity coordinates of a second color model. The validating program 153 is configured to determine whether the second chromaticity coordinates meet a second skin color threshold.

Figure 5:
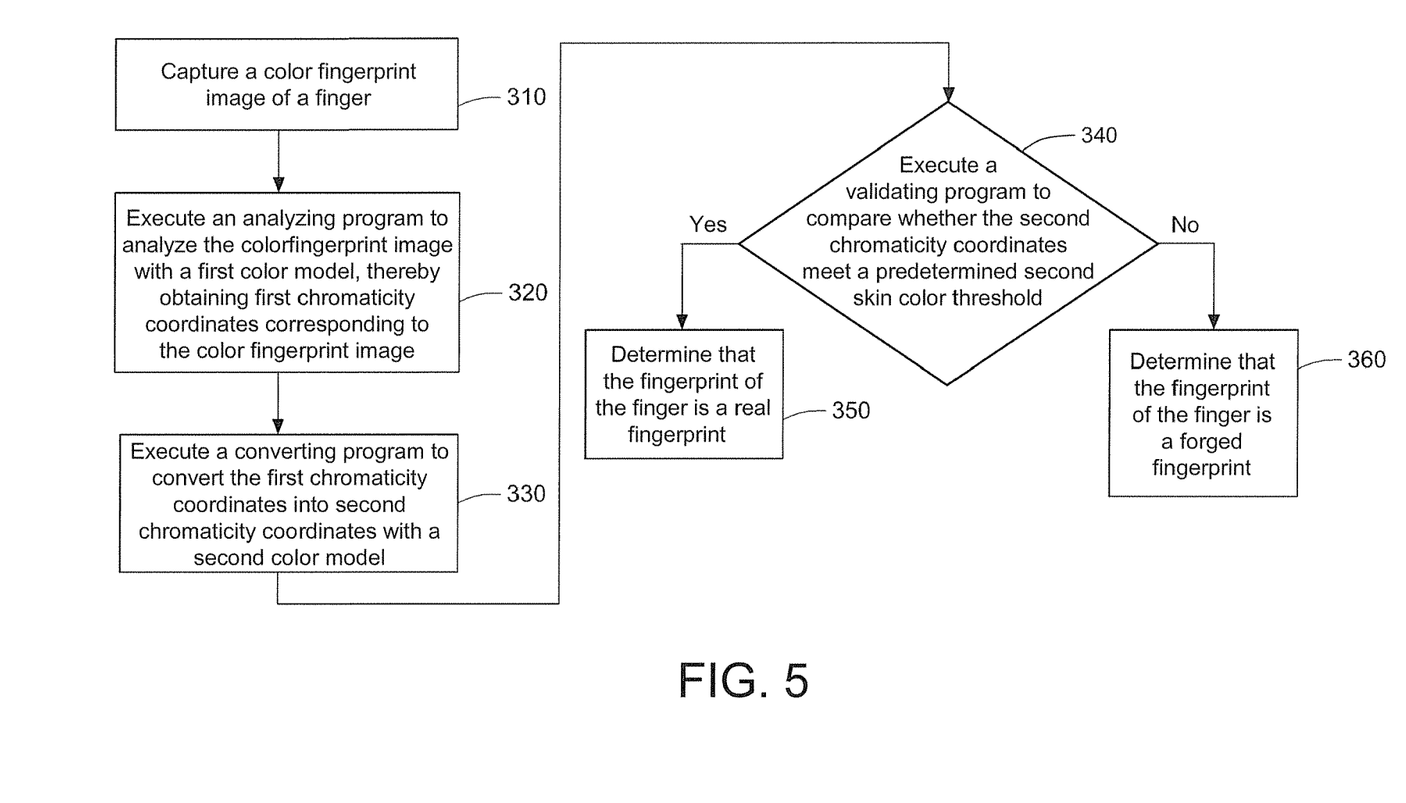
FIG. 5 is a schematic flowchart illustrating identification of a colored fingerprint image according to an embodiment of the invention.

Referring to FIG. 5, FIG. 5 is a schematic flowchart illustrating identification of a colored fingerprint image according to an embodiment of the invention, which includes steps as follows:

Step 310: capturing a colored fingerprint image 3 of the finger 2;

Step 320: executing the analyzing program 151 to analyze the colored fingerprint image 3 with the first color model, thereby obtaining the first chromaticity coordinates corresponding to the colored fingerprint image 3;

Step 330: executing the converting program 152 to convert the first chromaticity coordinates into the second chromaticity coordinates with the second color model;

Step 340: executing the validating program 153 to compare whether the second chromaticity coordinates meet the predetermined second skin color threshold;

Step 350: determining that a fingerprint of the finger is a real fingerprint if the second chromaticity coordinates meet the second skin color threshold; and Step 360: determining that a fingerprint of the finger is a forged fingerprint if the second chromaticity coordinates do not meet the second skin color threshold.

Figure 6:
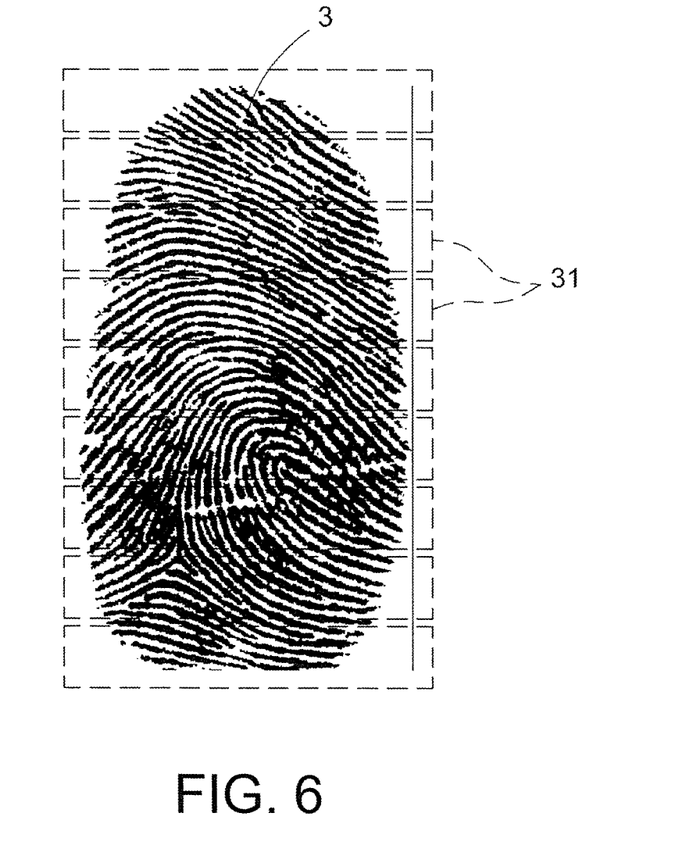
FIG. 6 is a schematic view illustrating capturing of a colored fingerprint image according to an embodiment of the invention.

At Step 310, in this embodiment, the light emitting element is described as a multiple wavelength light source, for example. However, the invention is not limited thereto. After the visible light beam VL is reflected by the skin pattern trough 21 and the skin pattern peak 22 of the finger 2, the photoelectronic sensor module 11 may receive the corresponding colored fingerprint image 3 and transmit the colored fingerprint 3 to the processor module 15. Referring to FIG. 6, FIG. 6 is a schematic view illustrating capturing of a fingerprint image according to an embodiment of the invention. Here, the processor module 15 may divide the complete colored fingerprint image 3 into a plurality of sub-images 31. Then, the sub-images are respectively and sequentially transmitted to the analyzing program 151 at Step 320 for an analyzing process.

Figure 7:
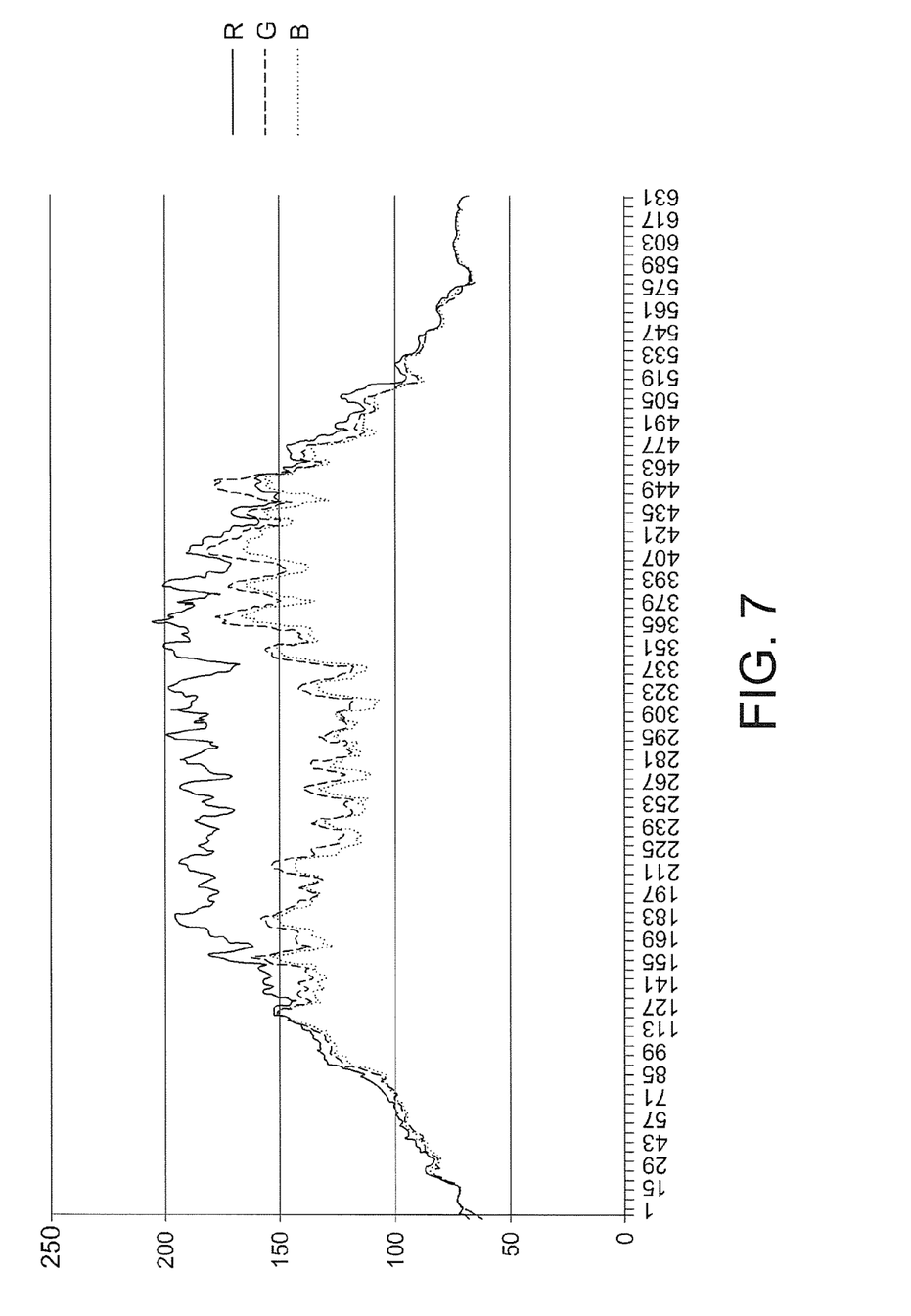
FIG. 7 is a schematic diagram illustrating first chromaticity coordinates of a real fingerprint according to an embodiment of the invention.

At Step 320, the analyzing program 151 perform a color model analysis on each of the sub-images 31 of the colored fingerprint image 3. Referring to FIG. 7, FIG. 7 is a schematic diagram illustrating first chromaticity coordinates of a real fingerprint according to an embodiment of the invention. In FIG. 7, a computing process is performed by the analyzing program based on one of the sub-images 31 of the colored fingerprint image 3, so as to obtain the first chromaticity coordinates after analyzing the colored fingerprint image 3 with the first color model. In this embodiment, the first color model may be an RGB color model. However, the invention is not limited thereto.

An X-axis coordinate of the first chromaticity coordinates represents a resolution of 640×480, whereas a Y-axis coordinate of the first chromaticity coordinates represents a pixel. A curve R represents a wavelength of red color, a curve G represents a wavelength of green color, and a curve B represents a wavelength of blue color. The X-axis coordinate is not limited to the resolution of 640×480 and may also be a resolution of 320×240. For the X-axis coordinate, a trimming size of the resolution may be chosen based on practical needs. Since the skin color may change through the course that the finger presses on the photoelectronic sensor module 11, namely part of the blood in the finger may be retained at a pressing region of the finger, while the rest of the blood may flow out of the pressing region, there is a significant skin color change during pressing of the finger. Accordingly, as shown in FIG. 7, since part of the blood of the finger is retained at the pressing region, in terms of values of the Y-axis coordinate, the red wavelength curve R may be significantly higher than the green wavelength curve G and the blue wavelength curve B.

Figure 8:
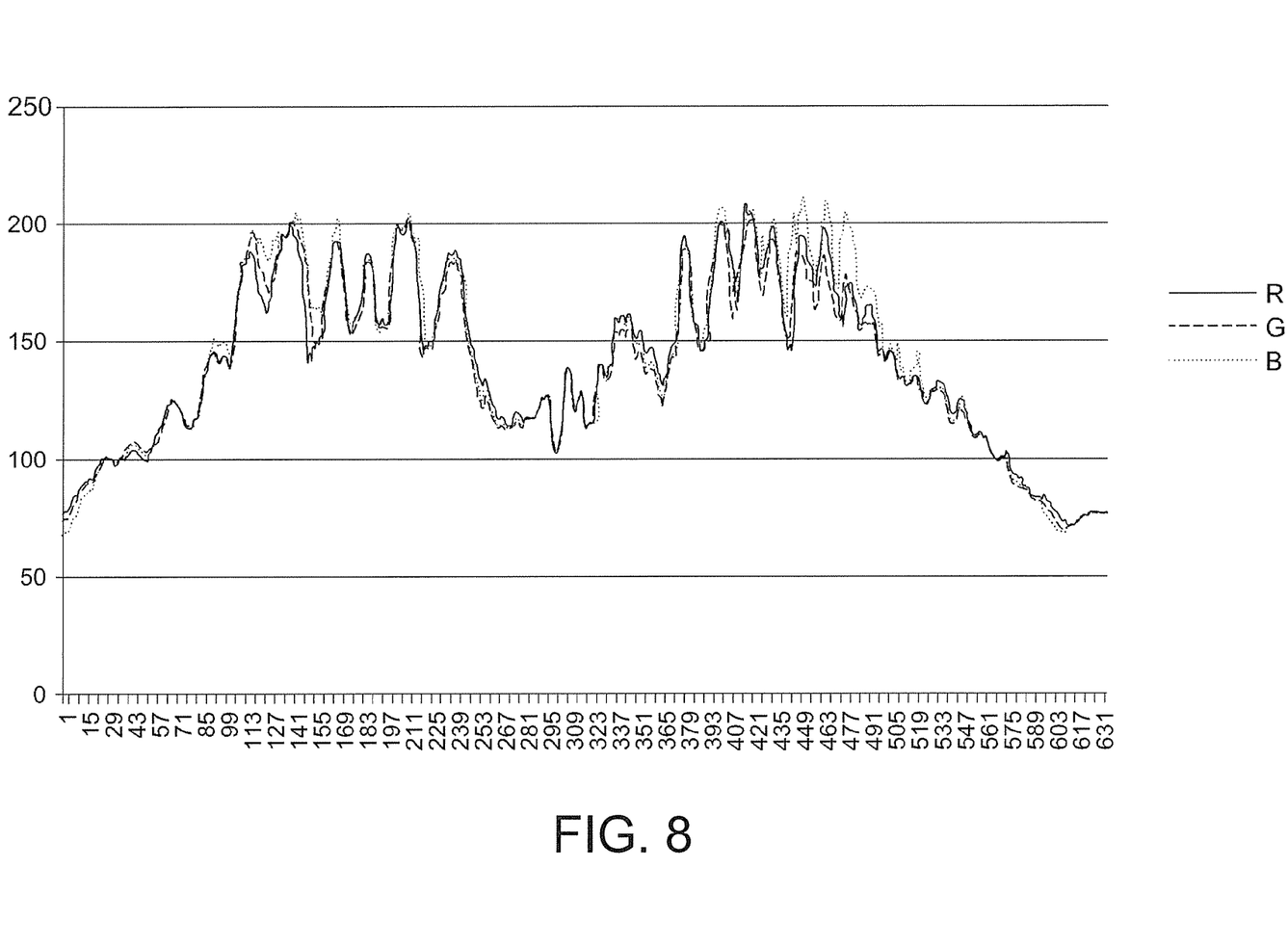
FIG. 8 is a schematic diagram illustrating first chromaticity coordinates of a forged fingerprint according to an embodiment of the invention.

Based on this principle, if a forged finger presses on the photoelectronic sensor module 11, the red wavelength curve R of the first chromaticity coordinates may not show a significant change. Referring to FIG. 8, FIG. 8 is a schematic diagram illustrating first chromaticity coordinates of a forged fingerprint according to an embodiment of the invention. As clearly shown in FIG. 8, since the forged fingerprint does not exhibit the characteristic of fluidity of blood and the change of skin color, the red wavelength curve R almost overlaps the green wavelength curve G and the blue wavelength curve B. Thus, it is determined that the fingerprint is forged.

Moreover, the following step is further included after Step 320: comparing, by the validating program 153, whether the first chromaticity coordinates meet a predetermined first skin color threshold, so as to determine whether the fingerprint is real or forged. Specifically, the embodiment satisfies the following equation, but is not limited thereto:

$$R - \min(B, G) > Z; \text{ and} \qquad (1)$$

$$10 < Z < 100, \qquad (2)$$

wherein R represents a value of the wavelength of red color, G represents a value of the wavelength of green color, blue represents a value of the wavelength of blue color, and Z represents the first skin color threshold. When $10 < Z < 100$ is satisfied, Step 330 is carried out, and when $10 < Z < 100$ is not satisfied, it is determined that the fingerprint is forged. It should be noted that the above equation merely serves as an example, and shall not be construed as a limitation to the protection scope of the invention. In other embodiments of the invention, a suitable equation may be set based on practical needs to determine whether the first chromaticity coordinates meet the first skin color threshold, and the set equation may be stored in the validating program 153.

However, there is still a circumstance where blood capillaries are forged on purpose in the forged finger formed of a silica gel material, such that the red wavelength curve R is higher than the green wavelength curve G and the blue wavelength curve B. Accordingly, Step 330 may be performed for another validation.

At Step 330, the converting program 152 converts the first chromaticity coordinates into the second chromaticity coordinates based on the second color model. For example, with the converting program 152, the RGB color model may be converted into a CYYK color model, and the first chromaticity coordinates of the RGB color model may be converted into the second chromaticity coordinates of the CMYK color model. A formula of conversion is provided in the following:

$$t_{RGB} = \{R, G, B\};$$

converting the RGB chromaticity coordinates into three color components:

$$t_{CMY} = \{C', M', Y'\} = \{1-R, 1-G, 1-B\};$$

if $\min\{C', M', Y'\} = 1$, then $t_{CMYK} = \{0,0,0,1\}$;

if not, the chromaticity coordinates are converted into four color components:

$$K = \min\{C', M', Y'\}$$

$$t_{CMYK} = \left\{ \frac{C' - K}{1 - K}, \frac{M' - K'}{1 - K}, \frac{Y' - K}{1 - K}, K \right\}$$

Accordingly, the RGB chromaticity coordinates are converted into CMYK chromaticity coordinates by the converting program 152. It should be noted that the conversion from the first chromaticity coordinates into the second chromaticity coordinates is not limited to the conversion from the RGB chromaticity coordinates into the CMYK chromaticity coordinates. Based on the needs, the RGB chromaticity coordinates may also be converted into YUV chromaticity coordinates, CIE XYZ chromaticity coordinates, or HSV chromaticity coordinates, so as to obtain skin color changes in different chromaticity coordinates. Besides, the first color model is not limited to the RGB color model. The first color model may also be a YUV color model, a YCbCr color model, a RAW Bayer color model, a CCIR color model, an ITU color model, or a RAW RGB color model. A suitable color model may be chosen as the first color model based on practical needs. Thus, after the first chromaticity coordinates are converted into the second chromaticity coordinates, Step 340 may be carried out for validation.

From Step 340 to 360, the validating program 153 compares whether the second chromaticity coordinates meet the predetermined second skin color threshold, so as to determine whether the fingerprint is real or forged. In this embodiment, statistical analyses are adopted to analyze distributions of skin color variation of the real fingerprint in various kinds of chromaticity coordinates (e.g., the CMYK chromaticity coordinates, the YUV chromaticity coordinates, the CIE XYZ chromaticity coordinates, or the HSV chromaticity coordinates, etc.), so as to set the second skin color thresholds corresponding to the respective second chromaticity coordinates.

Figure 9:
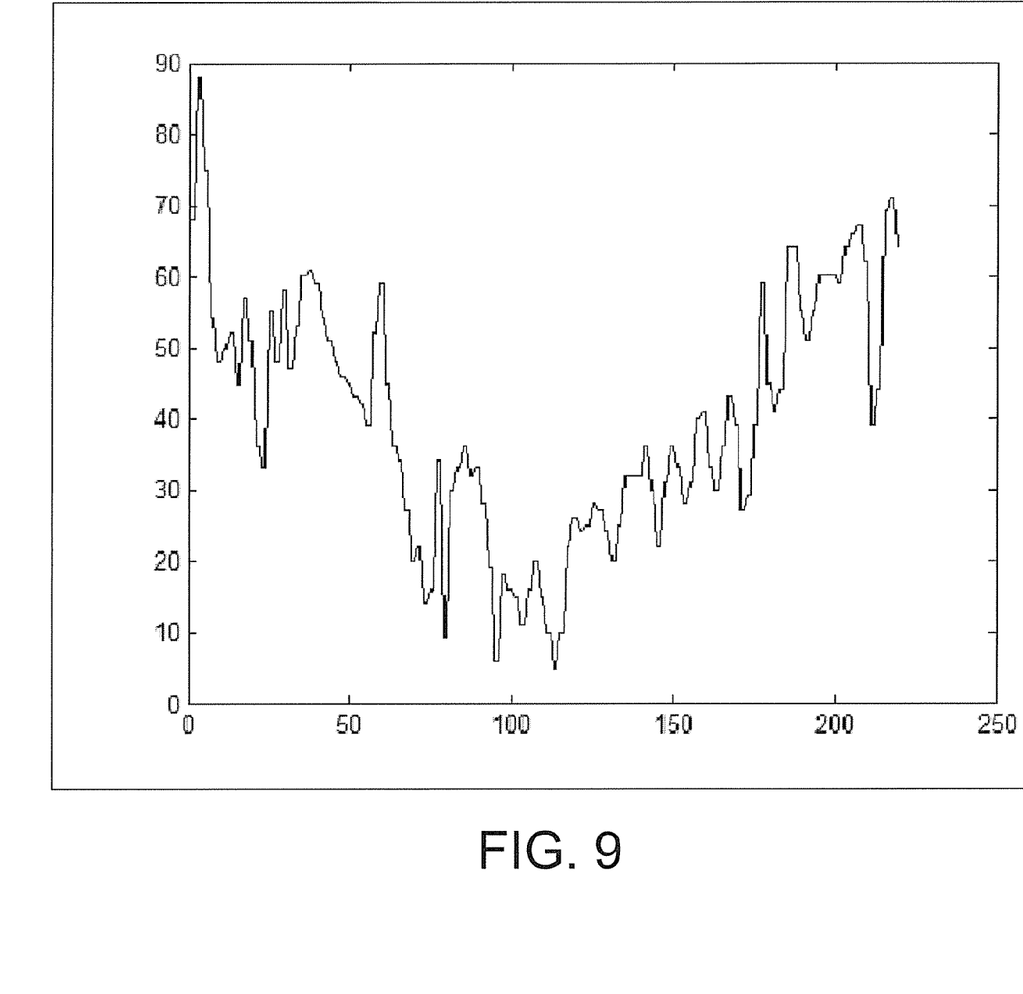
FIG. 9 is a schematic diagram illustring second chromaticity coordinates of a real fingerprint according to an embodiment of the invention.
Figure 10:
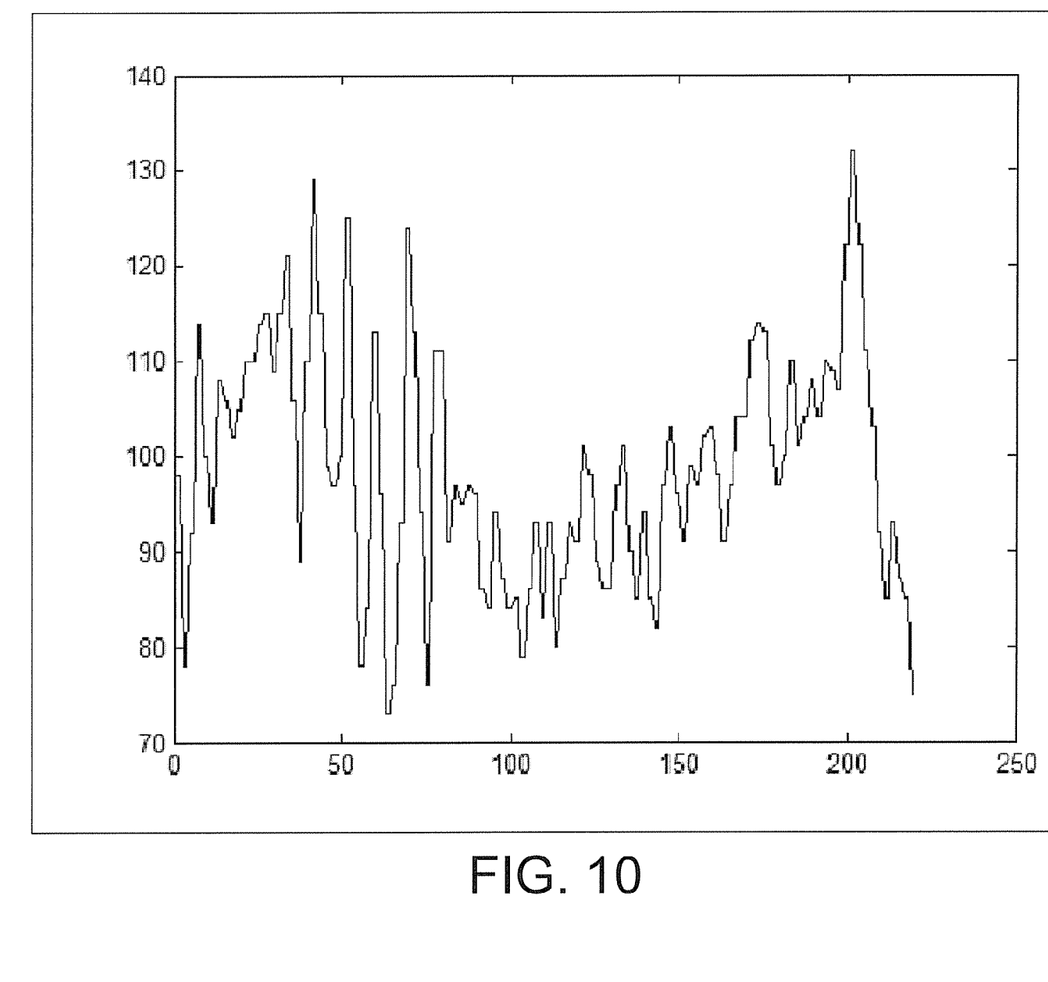
FIG. 10 is a schematic diagram illustrating second chromaticity coordinates of a forged fingerprint according to an embodiment of the invention.

Referring to FIGS. 9 and 10, FIG. 9 is a schematic diagram illustrating second chromaticity coordinates of a real fingerprint according to an embodiment of the invention, and FIG. 10 is a schematic diagram illustrating second chromaticity coordinates of a forged fingerprint according to an embodiment of the invention. In this embodiment, the validating program 153 is configured to compare whether the second chromaticity coordinates meet the predetermined lined second skin color threshold, so as to determine whether the fingerprint is real or forged. For example, the embodiment satisfies the following equation, but is not limited thereto:

$$Y < Z'; \quad (1)$$

$$10 < Z' < 100, \quad (2)$$

wherein Y represents a color-level value of yellow color, and Z' represents the second skin color threshold. When $10 < Z' < 100$ is satisfied, the validating program 153 determines that the fingerprint is real, and when $10 < Z' < 100$ is not satisfied, the validating program determines that the fingerprint is forged. It should be noted that the above equation merely serves as an example, and shall not be construed as a limitation to the protection scope of the invention. Namely, a suitable equation may be set based on practical needs to determine whether the second chromaticity coordinates meet the second skin color threshold, and the set equation may be stored in the validating program 153.

In this way, if the blood capillaries are designed in the forged finger based on the first color model (the RGB color model), even though the condition that the red wavelength curve R is significantly higher than the green wavelength curve G and the blue wavelength curve B is met, whether the fingerprint is real may be further determined by the validating program 153 based on the second skin color threshold of the second chromaticity coordinates. If the converted second chromaticity coordinates meet the second skin color threshold, it is determined that the finger is real. If the second chromaticity coordinates do not meet the second skin color threshold, it is determined that the finger is forged.

Figure 11:
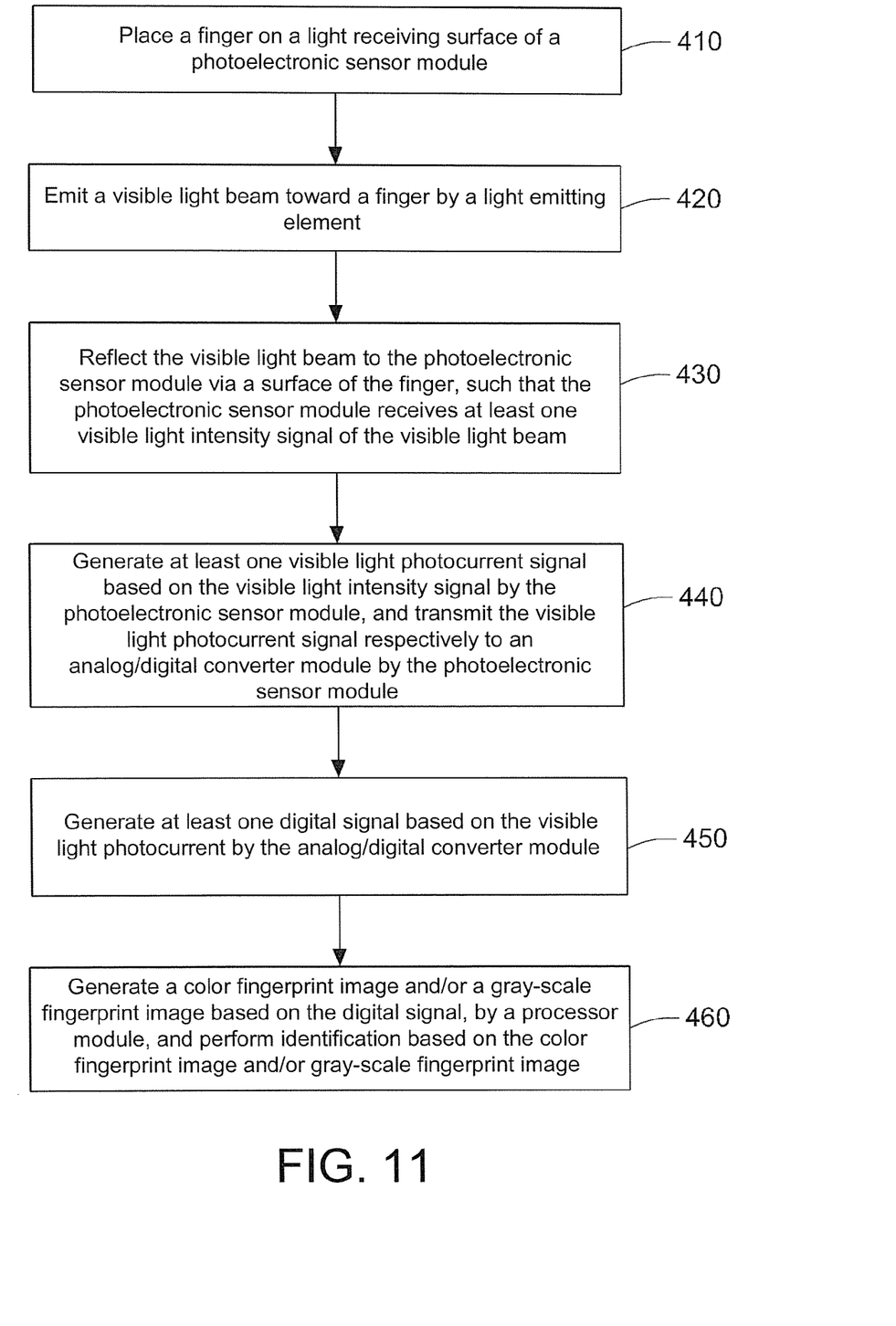
FIG. 11 is another schematic flowchart illustrating a fingerprint identification method according to an embodiment of the invention.

Referring to FIG. 11, FIG. 11 is another schematic flowchart illustrating a fingerprint identification method according to an embodiment of the invention. Details of the embodiment shown in FIG. 11 are substantially the same as the fingerprint identification method of the previous embodiment. Thus, in the following, only the differences are described, and the identical parts are not further reiterated. The fingerprint identification method of this embodiment includes steps as follows:

Step 410: placing the finger 2 on the light receiving surface 112 of the photoelectronic sensor module 11;

Step 420: emitting the visible light beam VL toward the finger 2 by the second light emitting element 13;

Step 430: reflecting the visible light beam VL to the photoelectronic sensor module 11 via the surface of the finger 2, such that the photoelectronic sensor module 11 receives at least one visible light intensity signal IS2 of the visible light beam VL;

Step 440: generating at least one visible light photocurrent signal PS2 based on the visible light intensity signal IS2 by the photoelectronic sensor module 11, and transmitting the visible light photocurrent signal PS2 to the analog/digital converter module 14 by the photoelectronic sensor module;

Step 450: generating at least one second digital signal DS2 based on the visible light photocurrent signal PS2 by the analog/digital converter module 14; and Step 460: generating the colored fingerprint image and/or the gray-scale fingerprint image based on the second digital signal DS2, and performing identification based on the colored fingerprint image and/or the gray-scale fingerprint image by the processor module 15.

At Step 460, the processes that the processor module 15 performs identification based on the colored fingerprint image are the same as those described in FIGS. 5 to 10. In addition, the converting program 152 of the processor module 15 may further convert the colored fingerprint image into the gray-scale fingerprint image, and then the validating program 153 may perform identification based on the converted gray-scale fingerprint image, so as to determine whether the finger is real.

Accordingly, in the fingerprint identification method and the fingerprint identification device according to the embodiments of the invention, the photoelectronic sensor module is used to receive the invisible light beam reflected after passing through the finger, and the different invisible light intensity signals emitted via the skin pattern trough and the skin pattern peak of the finger are converted into the invisible light intensity signals having different intensities by the photoelectronic sensor module, and then the analog/digital converter module converts the invisible light intensity signals having different intensities into the corresponding first digital signals, so that the gray-scale fingerprint image with patterns in different brightness may be obtained after the first digital signals are output to the processor module for processing.

In addition, by converting the first chromaticity coordinates into the second chromaticity coordinates, whether the fingerprint of the colored fingerprint image is forged is determined again based on the predetermined second skin color threshold of the second chromaticity coordinates. Accordingly, the loophole of fingerprint identification is eliminated by avoiding the forged fingerprint produced by utilizing the characteristic of skin color variation of the first chromaticity coordinates, thereby enhancing the capability of correctly distinguishing between real and forged fingerprints.

Consequently, with the characteristics of being light and compact of the photoelectronic sensor module, the fingerprint identification device according to the embodiments of the invention may be installed inside a handheld device, thereby improving on the issue that the conventional optical fingerprint identification device is too large to be used in the handheld device. Besides, the identification may be performed based on the gray-scale fingerprint image and the colored fingerprint image to determine whether the finger is forged, so as to increase the accuracy of fingerprint identification. Accordingly, an unauthorized user is unable to deceive the fingerprint identification device by using a forged finger, and the loophole of fingerprint identification is consequently eliminated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fingerprint identification method, comprising:
   placing a finger on a photoelectronic sensor module;
   emitting an invisible light beam toward the finger by a first light emitting element and emitting a visible light beam toward the finger by a second light emitting element;
   reflecting the invisible light beam to the photoelectronic sensor module after the invisible light beam passes through the finger, such that the photoelectronic sensor module receives at least one invisible light intensity signal of the invisible light beam, and reflecting the visible light beam to the photoelectronic sensor module via a surface of the finger, such that the photoelectronic sensor module receives at least one visible light intensity signal of the visible light beam;
   generating at least one invisible light photocurrent signal based on the invisible light intensity signal by the photoelectronic sensor module, generating at least one visible light photocurrent signal based on the visible light intensity signal by the photoelectronic sensor module, and transmitting the invisible light photocurrent signal and the visible light photocurrent signal respectively to an analog/digital converter module by the photoelectronic sensor module;
   generating at least one first digital signal based on the invisible light photocurrent signal by the analog/digital converter module, generating at least one second digital signal based on the visible light photocurrent signal by the analog/digital converter module, and transmitting the first digital signal and the second digital signal respectively to a processor module by the analog/digital converter module; and
   generating a gray-scale fingerprint image based on the first digital signal by the processor module, generating a colored fingerprint image based on the second digital signal by the processor module, and performing identification based on the gray-scale fingerprint image and the colored fingerprint image, wherein the processor module comprises an analyzing program, a converting program and a validating program, and the step of performing identification based on the colored fingerprint image further comprises:
   executing the analyzing program to analyze the colored fingerprint image with a first color model, thereby obtaining first chromaticity coordinates corresponding to the colored fingerprint image;
   executing the converting program to convert the first chromaticity coordinates into second chromaticity coordinates with a second color model;
   executing the validating program and comparing whether the second chromaticity coordinates meet a predetermined second skin color threshold;
   determining that a finger print of the finger is a real fingerprint if the second chromaticity coordinates meet the second skin color threshold; and
   determining that a finger print of the finger is a forged fingerprint if the second chromaticity coordinates do not meet the second skin color threshold;
   wherein the step of analyzing the colored fingerprint image with the first color model further comprises:
   setting the first color model to be an RGB color model;
   obtaining the corresponding first chromaticity coordinates based on the RGB color model, obtaining a red wavelength curve, a green wavelength curve and a blue wavelength curve based on the first chromaticity coordinates;
   determining whether the red wavelength curve overlaps the green wavelength curve and the blue wavelength curve; and
   executing the converting program if the red wavelength curve does not overlap the green wavelength curve and the blue wavelength curve.

2. The fingerprint identification method as claimed in claim 1, wherein the fingerprint image is divided into a plurality of sub-images, and the sub-images are respectively and sequentially transmitted to the analyzing program for an analyzing process.

3. The fingerprint identification method as claimed in claim 1, wherein the step of obtaining the first chromaticity coordinates corresponding to the fingerprint image further comprises: executing the validating program to compare whether the first chromaticity coordinates meet a predetermined first color threshold.

4. A fingerprint identification device, configured to identify a fingerprint image of a finger, the fingerprint identification device comprising:
   a photoelectronic sensor module, having a light receiving surface and configured for the finger to come into contact with;
   at least one first light emitting element, emitting an invisible light beam toward the finger;
   at least one second light emitting element, emitting a visible light beam toward the finger;
   an analog/digital converter module, electrically connected to the photoelectronic sensor module; and
   a processor module, electrically connected to the analog/digital converter module,
   wherein the invisible light beam is reflected to the photoelectronic sensor module after passing through the finger, such that the photoelectronic sensor module receives at least one invisible light intensity signal of the invisible light beam, the visible light beam is reflected to the photoelectronic sensor module via a surface of the finger, such that the photoelectronic sensor module receives at least one visible light intensity signal of the visible light beam, the photoelectronic sensor module respectively converts the invisible light intensity signal into an invisible light photocurrent signal and converts the visible light intensity signal into a visible light photocurrent signal, the analog/digital converter module respectively converts the invisible light photocurrent signal into a first digital signal and converts the visible light photocurrent signal into a second digital signal, and the processor module respectively outputs a gray-scale fingerprint image based on the first digital signal and outputs a colored fingerprint image based on the second digital signal for identification, wherein the processor module further comprises:
an analyzing program, analyzing the colored fingerprint image with a first color model to obtain first chromaticity coordinates;
a converting program, converting the first chromaticity coordinates into second chromaticity coordinates with a second color model; and
a validating program, configured to compare whether the second chromaticity coordinates meet a predetermined second skin color threshold,
wherein the analyzing program sets the first color model to be an RGB color model, obtains the corresponding first chromaticity coordinates based on the RGB color model, obtains a red wavelength curve, a green wavelength curve and a blue wavelength curve based on the first chromaticity coordinates, determines whether the red wavelength curve overlaps the green wavelength curve and the blue wavelength curve, and executes the converting program when the red wavelength curve does not overlap the green wavelength curve and the blue wavelength curve.

5. The fingerprint identification device as claimed in claim 4, wherein the photoelectronic sensor module is formed by arranging a plurality of photoelectronic sensing elements in an array, the photoelectronic sensing elements comprise a plurality of visible light sensing chips and a plurality of invisible light sensing chips, the visible light sensing chips and the invisible light sensing chips are arranged in adjacency and form the light receiving surface.

6. The fingerprint identification device as claimed in claim 5, further comprising a scattering medium covering the light receiving surface of the photoelectronic sensor module and provided for the finger to come into contact with.

7. The fingerprint identification device as claimed in claim 4, wherein processor module is configured to divide the fingerprint image into a plurality of sub-images and respectively and sequentially transmit the sub-images to the analyzing program for an analyzing process.

8. A fingerprint identification method, comprising:
placing a finger on a photoelectronic sensor module;
emitting a light beam toward the finger by a first light emitting element;
reflecting the visible light beam to the photoelectronic sensor module via a surface of the finger, such that the photoelectronic sensor module receives at least one visible light intensity signal of the visible light beam;
generating at least one visible light photocurrent signal based on the visible light intensity signal by the photoelectronic sensor module, and transmitting the visible light photocurrent signal to an analog/digital converter module by the photoelectronic sensor module;
generating at least one digital signal based on the visible light photocurrent signal by the analog/digital converter module, and transmitting the digital signal to a processor module by the analog/digital converter module; and
generating a colored fingerprint image and/or a gray-scale fingerprint image based on the digital signal and performing identification based on the colored fingerprint image and/or the gray-scale fingerprint image by the processor module, wherein the processor module comprises an analyzing program, a converting program and a validating program, and the step of performing identification based on the colored fingerprint image further comprises:
executing the analyzing program to analyze the colored fingerprint image with a first color model, thereby obtaining first chromaticity coordinates corresponding to the colored fingerprint image;
executing the converting program to convert the first chromaticity coordinates into second chromaticity coordinates with a second color model;
executing the validating program and comparing whether the second chromaticity coordinates meet a predetermined second skin color threshold;
determining that a fingerprint of the finger is a real fingerprint if the second chromaticity coordinates meet the second skin color threshold; and
determining that a fingerprint of the finger is a forged fingerprint if the second chromaticity coordinates do not meet the second skin color threshold;
wherein the step of analyzing the colored fingerprint image with the first color model further comprises:
setting the first color model to be an RGB color model;
obtaining the corresponding first chromaticity coordinates based on the RGB color model, obtaining a red wavelength curve, a green wavelength curve and a blue wavelength curve based on the first chromaticity coordinates;
determining whether the red wavelength curve overlaps the green wavelength curve and the blue wavelength curve; and
executing the converting program if the red wavelength curve does not overlap the green wavelength curve and the blue wavelength curve.

9. The fingerprint identification method as claimed in claim 8, wherein the fingerprint age is divided into a plurality of sub-images, and the sub-images are respectively and sequentially transmitted to the analyzing program for an analyzing process.

10. The fingerprint identification method as claimed in claim 8, wherein the step of obtaining the first chromaticity coordinates corresponding to the fingerprint image further comprises: executing the validating program to compare whether the first chromaticity coordinates meet a predetermined first color threshold.

11. The fingerprint identification method as claimed in claim 8, wherein the converting program further converts the color fingerprint image into the gray-scale fingerprint image, and the validating program determines whether the gray-scale fingerprint image is a real fingerprint.

* * * * *